Feb. 25, 1936.                    C. C. FARMER                 2,032,120
                              FLUID PRESSURE BRAKE
                              Filed Dec. 24, 1931
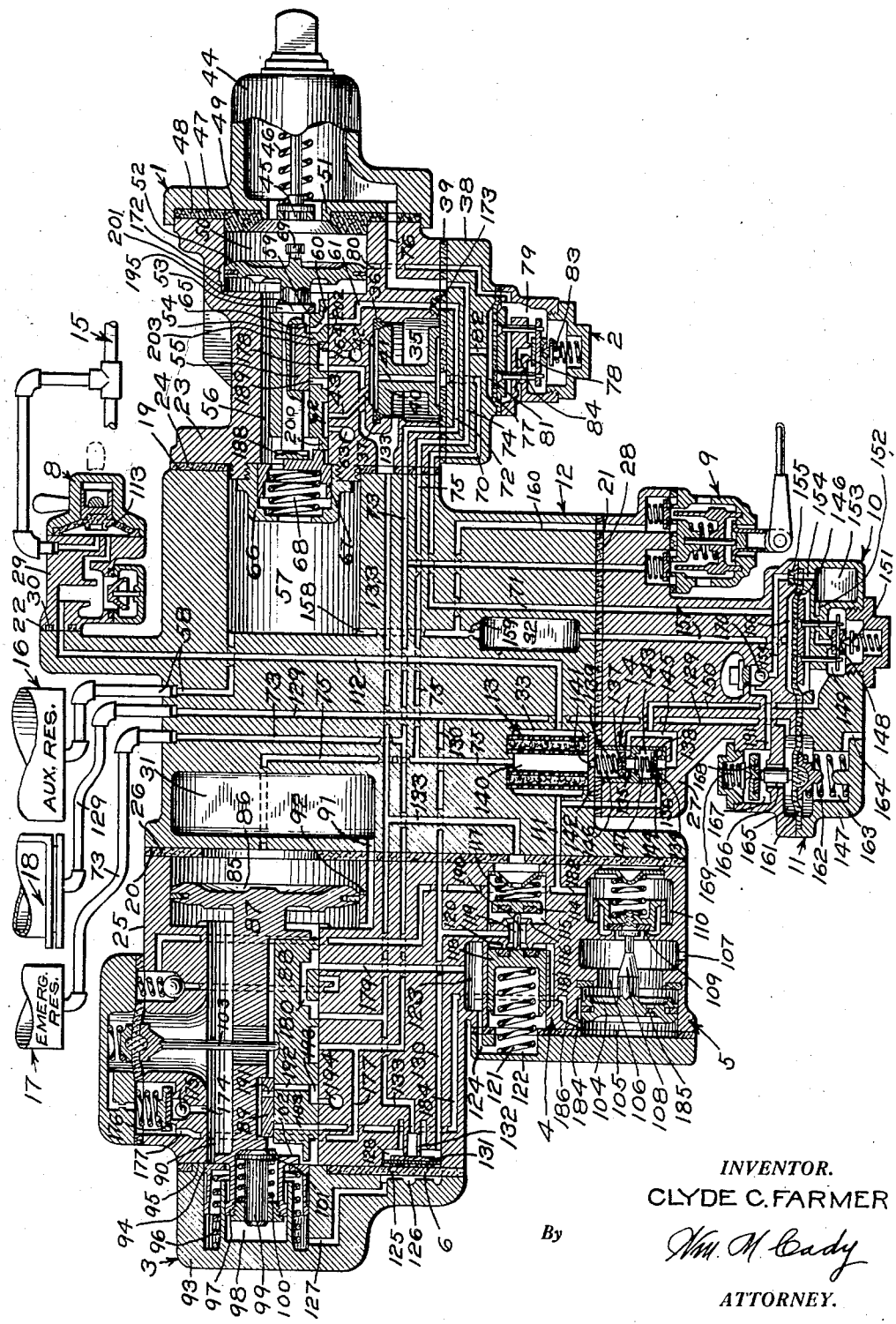
INVENTOR.
CLYDE C. FARMER
By  Wm. M. Cady
ATTORNEY.

Patented Feb. 25, 1936

2,032,120

UNITED STATES PATENT OFFICE 2,032,120

FLUID PRESSURE BRAKE

Clyde C. Farmer, Pittsburgh, Pa., assignor to The Westinghouse Air Brake Company, Wilmerding, Pa., a corporation of Pennsylvania Application December 24, 1931, Serial No. 582,905

43 Claims. (Cl. 303—35)

This invention relates to fluid pressure brake equipment which operates according to variations in brake pipe pressure to control the application and release of the brakes and particularly to the type of equipment disclosed in my pending application filed May 20, 1932, Serial No. 612,465.

For the purpose of economy, there is a continuing tendency to increase the number of cars in a train and where heretofore a freight train might consist of 100 cars, it is now desired to operate trains of 150 or more cars.

The brake equipment at present employed was originally designed to operate in trains up to 100 cars, but with the continuing increase in train length, various operating difficulties are being encountered and especially in obtaining the desired operation of the equipment on the cars at the rear end of a long train.

One object of my invention is to provide a fluid pressure brake equipment capable of handling very long trains and which is adapted to utilize, without excessive or costly alterations, the ordinary triple valve device now employed on railway cars, as a part of the improved equipment, so that in case the improved equipment is substituted for the equipment now in use, it will not be necessary to discard or scrap the old triple valve device.

Another object of my invention is to provide an improved brake equipment having improved means for effecting a local discharge of fluid under pressure from the brake pipe in effecting an application of the brakes to accelerate the movement of the triple valve devices, throughout the length of the train, to application position.

A further object of my invention is to provide an improved brake equipment having a quick service valve device which is subject to the opposing pressures of the brake pipe and a chamber charged with fluid under pressure from the auxiliary reservoir and which is operative upon a reduction in brake pipe pressure to establish communication through which fluid under pressure is locally discharged from the brake pipe and also having means whereby the quick service valve device will be maintained in brake pipe venting position for a predetermined period of time after the flow of fluid to the brake cylinder is initiated, said period of time being of sufficient duration to permit a valve device operated by brake cylinder pressure to function to control the local venting of fluid under pressure from the brake pipe, thus insuring the desired quick service action throughout the length of the train.

According to another feature of my invention, the venting of fluid under pressure from the brake pipe to effect a quick serial action (commonly known as quick service) in a service application of the brakes, is effected by a valve device separate from the brake controlling valve device and upon a light but predetermined and definite reduction in brake pipe pressure.

Other objects and advantages will appear in the following more detailed description of the invention.

In the drawing, the single figure is a diagrammatic view, mainly in section, of my improved fluid pressure brake equipment.

As shown in the drawing, the equipment may comprise a triple valve device 1, a release insuring valve device 2, an emergency valve device 3, a combined inshot and cut-off valve device 4, an emergency vent valve device 5, a timing valve device 6, a combined centrifugal dirt collector and cut-out cock 8, a reservoir release valve device 9, a quick service valve device 10, a quick service modifying valve device 11, a pipe bracket 12, an air strainer 13, a double check valve 14, a brake pipe 15, an auxiliary reservoir 16, an emergency reservoir 17 and a brake cylinder 18.

The pipe bracket 12 is provided with gasket faces 19, 20, 21 and 22, the faces 19 and 20 being preferably disposed opposite each other. The casing 23 of the triple valve device 1 is secured to the face 19, there being a gasket 24 interposed between said casing and face, and the casing 25 of the emergency valve device 3 is secured to the face 20, there being a gasket 26 interposed between said casing and face. Secured to the gasket face 21 is a casing 27 which carries the reservoir release valve device 9, the quick service valve device 10 and the quick service modifying valve device 11, a gasket 28 being interposed between said casing and face, and secured to the gasket face 22 is the casing 29 of the combined centrifugal dirt collector and cut-out cock 8, there being an annular gasket 30 interposed between said casing and face.

Formed in the pipe bracket are a plurality of fluid conducting passages which are open to the several clamping faces of the bracket where they are adapted to register with corresponding passages formed in the casings of the several devices secured to the bracket. There is also formed in the bracket a quick action chamber 31, a volume chamber 32 and a chamber 33 containing the air strainer 13, which is of hollow circular form.

The triple valve device 1 in the present embodiment of the invention is of the K type which has been converted for use in my improved equipment. In converting an old triple valve device, the check valve casing, check valve contained in this casing, quick action mechanism and emergency piston bushing are removed from the casing 23, leaving the chamber 35, which contained the quick action mechanism and emergency piston bushing, open at one end. Within the chamber 35, adjacent its other end, a groove 36 is formed in the casing 23 into which an annular packing ring 37 is snapped, the inner surface of said ring sloping downwardly and outwardly. The open end of this chamber is closed by a cap 38 which is a new part and is clamped to the salvaged casing 23 in any desired manner, there being a new gasket 39 interposed between the cap and the casing.

Contained in the chamber 35 is a filler member 40, which is clamped in sealing engagement with the annular packing ring 37 and the gasket 39 by the cap 38. This member is provided with a quick service passage 41, which, at one end, is open to a chamber 42 defined by the upper end of the filler member and the casing 23, said chamber 42 being open to the seat for the main slide valve through the old quick service and emergency passage 43.

The old piston chamber cap 44 and graduating spring 46 and stop 45 carried by the cap, are secured to the salvaged casing 23, there being a new gasket 47 interposed between the cap and casing, the old gasket being discarded.

This gasket 47 is provided with an outer flat portion 48 which is clamped between the cap 44 and casing 23 and is also provided with a circular thickened portion 49 which extends into the piston chamber 50 and closely engages the casing within the chamber, thus providing a heel which prevents the inner edge of the gasket from moving inwardly from its proper position. The inner edge of the gasket closely engages with an inwardly extending annular lug 51 on the cap 44. The lug is of less length than the thickness of the portion 49 and serves to assist in maintaining the inner portion of the gasket in its proper position. The thickened portion 49 also provides a yielding stop for the triple valve piston 52 contained in the chamber 50 and is adapted to prevent the piston from moving to its old emergency position. From the end of the lug 51 the inner edge of the gasket is beveled for the purpose of exposing as much of the face of the piston as possible to brake pipe pressure when the piston is in sealing engagement with the gasket.

The triple valve piston 52 from the old triple valve device is used without change and has a stem 53 adapted to operate a main slide valve 54 and an auxiliary slide valve 55 contained in a chamber 56 connected to the auxiliary reservoir 16 through a chamber 57 in the pipe bracket and a passage and pipe 58. The slide valves are from the old triple valve device and are slightly modified, the modification of the main slide valve consisting of providing the old quick service port 59 with a tail cavity 60 which is adapted to register with the old quick service passage 61 in the casing 23 in the release and retarded release positions of the triple valve device and further consisting in providing a new quick service cavity 62, which, in either the release or retarded release position of the triple valve device, connects the quick service passage 43 to a new exhaust passage 63 drilled in the casing 23, which passage is separate from the brake cylinder exhaust passage 64 leading to the usual brake cylinder pressure retainer valve device (not shown). It will here be understood that the passage 61 and port 59 in the present embodiment of the invention do not constitute a quick service communication but serve as a charging communication between the emergency reservoir 17 and the auxiliary reservoir 16, as will hereinafter more fully be described. The auxiliary slide valve 55 is modified by milling a portion of the valve to open the old quick service cavity to one end of the slide valve so as to provide a cavity 65, which establishes communication between the charging port 59 and the valve chamber 56 when the triple valve device is in either release or retarded release position.

Contained in the old cage member 66, which has screw-threaded connection with the casing, is a retarded release stop 67 subject to the pressure of a spring 68, said stop and spring being salvaged from the old triple valve device and used without change.

The piston 52 has a centrally arranged projection 69 which extends outwardly and is adapted to engage the inner end of the member 45 just before the piston seals against the thickened portion 49 of the gasket 47, that is to say, before the piston is brought to a stop in application position by its engagement with the gasket, so that when the piston is in sealing engagement with the gasket and the brake pipe pressure is increased to effect a release of the brakes, the spring 46 acts, through the medium of the member 45, to assist fluid at brake pipe pressure acting on the inner seated area of the piston in shifting the piston out of sealing engagement with the gasket and thus more quickly expose the entire face of the piston to brake pipe pressure than if brake pipe pressure alone were relied upon to break the seal.

The cap 38, which closes the open end of the chamber 35, has formed therein a quick service passage 70 which, at one end, registers with the quick service passage 41 in the filler member 40 and which, at the other end, registers with a quick service passage 71 in the pipe bracket, and has a charging passage 72, which connects a passage 23 in the pipe bracket leading from the emergency reservoir 17 with the passage 61. This cap also has a brake pipe passage 74, which connects a brake pipe passage 75 in the pipe bracket with the old brake pipe passage 76 in the triple valve casing which leads to the piston chamber 50.

The release insuring valve device 2 is for the purpose of venting fluid under pressure from the auxiliary reservoir 16 when brake pipe pressure is increased to effect a release of the brakes to facilitate the movement of the triple valve piston 52 and slide valves to release position. The details of construction and functions of this device are substantially the same as for the corresponding device fully disclosed in my prior application filed December 9, 1931, Serial No. 579,887. This device comprises a casing which is secured to the cap 38 and also comprises a flexible diaphragm 77, which is adapted to control the operation of an exhaust valve 78 contained in a chamber 79 at one side of the diaphragm. This chamber is normally connected to the triple valve piston chamber 50 through a passage 80 provided in the triple valve casing, cap 38 and casing of the release insuring valve device, and is connected to the valve chamber 56 when the triple valve piston 52 is in application position, said piston controlling the connection to said chambers. The passage 80 has been newly drilled in the triple valve casing 23 as there was no such passage in the casing originally. At the other side of the diaphragm 77 there is a chamber 81, which is connected with the brake pipe passage 74 in the cap 38 through a branch passage 82 in the cap. The exhaust valve is subject on one side to the pressure of spring-pressed member 83 and is adapted to control communication from the chamber 79 to a restricted passage 84 open to the atmosphere.

The emergency valve casing 25 has a piston chamber 85 connected to the brake pipe passage 75 and containing a piston 86 having a stem 87 adapted to operate a main slide valve 88 and an auxiliary slide valve 89 contained in a valve chamber 90 connected to the quick action chamber 31 in the pipe bracket 12 through a passage 91. With the emergency piston in release position as shown in the drawing, the piston chamber 85 is connected to the passage 91 through a restricted port 92.

The left hand end of the emergency valve chamber is closed by a cover plate 93 which is secured to the casing 25 and defines a portion of the emergency valve chamber. Disposed in this portion of the valve chamber is a resistance device which comprises a movable member 94 normally pressed into engagement with a shoulder 95 on the casing by means of a spring 96.

The rear end of the piston stem 87 is made in the form of a hollow guide portion 97, which is slidably mounted in a bore 98 in the cover plate 93. Contained in the guide portion 97 and slidably carried thereby is a plunger 99 which is normally subject to the pressure of a spring 100, the outward movement of the plunger being limited by its engagement with a stop shoulder 101 formed on the piston stem. As will be hereinafter more fully described, the inner end of the plunger is adapted to be engaged by the main slide valve 88 when the emergency piston 86 operates toward emergency position and by reason of such engagement is maintained stationary while the stem moves forwardly relative thereto a distance which is limited by a stop 102 on the stem engaging the rear end of the main slide valve 88. This movement of the stem relative to the plunger causes the spring 100 to be compressed, so that when the piston 86 is in sealing engagement with the gasket 26 and fluid under pressure is supplied to the piston chamber 85 in effecting the release of the brakes, the spring will act through the medium of the piston stem 87 to assist the fluid under pressure acting on the inner seated area of the piston to move the piston from its sealing engagement with the gasket.

The main slide valve is adapted to be pressed into engagement with its seat through the medium of a mechanism 103, which is substantially the same in detail and function as the corresponding mechanism in the before mentioned Hewitt application.

Associated with the emergency valve device and mounted in the casing 25 thereof is the quick action device 5, which may comprise a quick action piston 104 having at one side a chamber 105 and having at the other side a chamber 106 open to the atmosphere through a passage 107. This piston is operatively connected by a stem 108 to a brake pipe vent valve 109 contained in a chamber 110 connected, through passages 182 and 111, to the strainer receiving recess 33 in the pipe bracket 12, said recess being connected to the brake pipe 15 through a brake pipe passage 112, a communication through the dirt collector device 29 and a communication past the normally open valve 113 in the cutout cock device 8.

Also contained within the casing 25 of the emergency valve device is the inshot valve mechanism 4 which is operative, when effecting an emergency application of the brakes, to control the rate at which fluid under pressure is initially supplied to the brake cylinder 18, said mechanism comprising a poppet valve 114 contained in a chamber 115 and adapted to be urged into engagement with a seat rib 116 by a spring 117, and also comprises a valve piston 118 having a projection 119 for moving the valve 114 from the seat rib 116. Normally, the valve piston is urged into engagement with a seat rib 120 by the action of a spring 121 contained in a chamber 122 at one side of the valve piston. The valve piston, when in this position, maintains the valve 114 unseated. The chamber 122 is constantly open to a small chamber or reservoir 123 through a passage 124.

The timing valve device is also contained in the casing 25 of the emergency valve device and operates in effecting an emergency application of the brakes to control the supply of fluid under pressure to the brake cylinder after the operation of the inshot valve mechanism, in other words, the timing valve device is operative to render the inshot valve mechanism ineffective to control the rate of flow of fluid under pressure to the brake cylinder under certain conditions. This timing valve device comprises a flexible diaphragm 125 which is clamped between the casing 25 and the cover plate 93. At one side of the diaphragm there is a chamber 126 which is connected, by a passage 127, to the emergency slide valve chamber 90. At the other side of the diaphragm there is a chamber 128 which is connected to a brake cylinder passage 129 through a passage 130 and which contains a valve 131 adapted to seat on a seat rib 132, the inner seated area of the valve being connected to a brake cylinder supply and release passage 133. The operation of the valve is controlled by the action of the flexible diaphragm 125.

The check valve device 14 is for the purpose of providing a by-pass around the strainer 13 in the event of the strainer becoming clogged and may comprise a cage member 134 which is mounted in the casing 27. This member is provided with seat ribs 135 and 136 upon which check valves 137 and 138 respectively, are adapted to seat, the check valve 137 being contained in a chamber 139, which is connected to the unobstructed passage 140 in the strainer 13, through a passage 141, in an end plate 142 of the strainer, and the check valve 138 being contained in a chamber 143, which is open to the brake pipe passage 112 through a passage 144, passage 111 and chamber 33 around the strainer 13. The check valve chamber 139 is also connected to the inner seated area of the check valve 138 through a passage 145. The check valves are urged into sealing engagement with their respective seat ribs by the action of light springs 146 and 147 respectively. These check valves normally cooperate in closing communication from the brake pipe passage 112 to the passage 75 by way of passage 111, passage 144 and check valve chamber 143. The check valve 137 is adapted to open and permit fluid under pressure to flow from the passage 144 and valve chamber 143 to the passage 75 by way of valve chamber 139, passage 141 when the strainer is clogged and the check valve 138 is operative to permit the flow of fluid in the opposite direction by way of passage 145.

The reservoir release valve device 9, which is mounted in the casing 27, is operative manually to vent fluid under pressure from the auxiliary reservoir or from both the auxiliary reservoir and the emergency reservoir to effect the release of the brakes independently of the usual brake valve device under certain train operations. This device is of substantially the same construction and functions in substantially the same manner as the device fully disclosed in Ellis E. Hewitt's pending application, Serial No. 547,820, filed June 30, 1931, therefore a detailed description of the device here is deemed unnecessary.

The quick service valve device 10, which is carried by the casing 27, is for the purpose of locally venting fluid under pressure from the brake pipe, when a light but predetermined and definite reduction in brake pipe pressure is initiated through the medium of the usual brake valve device (not shown) in effecting an application of the brakes, to propagate quick service action serially throughout the length of the train. This device may comprise a flexible diaphragm 146 which is clamped between the casing 27 and a cover plate 147 secured to the casing 27, said diaphragm being adapted to control the operation of an exhaust valve 148 contained in a chamber 149 at one side of the diaphragm. The chamber 149 is connected through a passage 150 to the passage 145 open, as before described, to the brake pipe passage 112 and passage 75. The exhaust valve 148 is subject on one side to the action of a spring-pressed member 151 and is adapted to control communication from the chamber 149 to a passage 152 leading to a small quick service bulb or chamber 153 in the cover plate 147, said bulb, in the release position of the triple valve device, being open to the atmosphere through a passage 154, passage 71, passage 70 in the triple valve cap 38, passage 41 in the filler member 40, passages 42 and 43, cavity 62 in the main slide valve 54 of the triple valve device and passage 63, there being a choke plug 155 interposed in the passage 154.

At the other side of the flexible diaphragm 146 there is a chamber 156, which is connected to the volume chamber 32 through a passage 157, said chamber 32 being open to the chamber 57 and consequently to the auxiliary reservoir 16 through a passage 158 which is restricted, as indicated by the reference character 159, at a point between the chamber 32 and an auxiliary reservoir release passage 160 leading from the passage 158 to the reservoir release valve device 9.

The quick service modifying valve device 11, which is carried by the casing 27, is substantially the same as the device disclosed in Glenn T. McClure's pending application, Serial No. 580,358, filed December 11, 1931, and, as described in this prior pending application, is for the purpose of modifying the local reduction in brake pipe pressure according to a predetermined brake cylinder pressure to insure a substantially uniform brake cylinder pressure being developed upon a light reduction in brake pipe pressure being effected through the medium of the brake valve device; so as to prevent the slack in the train from running in harshly. This device is briefly described as comprising a flexible diaphragm 161, which is clamped between the casing 27 and the cap 147, and which is subject on one side to the action of a spring 162 contained in a chamber 163 open to the atmosphere through a passage 164. At the other side of the diaphragm there is a chamber 165 which is open to the brake cylinder through the brake cylinder passage 129. The chamber 165 is normally connected through a communication 166 with a chamber 167 containing a modifying valve 168, which is controlled through the operation of the diaphragm 161 to control said communication, said valve being subject on one side to the action of a light coil spring 169. The passage 154 leading from the quick service bulb 153 is connected to the chamber 167, past a ball check valve 170 and through a passage 171.

In operation, to initially charge the equipment, fluid under pressure is supplied to the brake pipe 15 in the usual manner and flows from said brake pipe through the combined cut-out valve and centrifugal dirt collector 8 to the brake pipe passage 112 in the pipe bracket 12, and from this passage flows through the chamber 33 and through the strainer 13 to the emergency piston chamber 85 through passage 75. From the passage 75 fluid under pressure flows to the triple valve piston chamber 50 by way of passage 74 in the triple valve cap 38 and passage 76 in the triple valve casing 23.

With the triple valve piston 52 in full release position, as shown in the drawing, fluid under pressure flows from the piston chamber 50 to the auxiliary reservoir 16 by way of a feed groove 172 around the piston, valve chamber 56, chamber 57 and passage and pipe 58, thus charging the auxiliary reservoir. Fluid under pressure from the valve chamber 56 flows to the emergency reservoir 17 through cavity 65 in the auxiliary slide valve 55, port 59 in the main slide valve, passage 61 in the triple valve casing 23, a choke plug 173, passage 72 in the triple valve cap 38, and passage 73 in the pipe bracket 12, thus charging the emergency reservoir.

With the emergency piston 86 in release position as shown in the drawing, fluid under pressure flows from the emergency piston chamber 85 to the emergency valve chamber 90 and quick action chamber 31 through the restricted port 92 and passage 91. Fluid under pressure flows from the valve chamber 90 to the diaphragm chamber 126 in the timing valve device 6 through passage 127. If for any reason the pressure of fluid builds up more rapidly in the emergency valve chamber 90 than it does in the emergency reservoir 17, fluid under pressure will flow to the emergency reservoir 17 by way of a passage 174, past check valves 175 and 176 which are arranged in series, a passage 177 and passage 73.

In the release position of the triple valve device 1, the brake cylinder 18 is open to the atmosphere through pipe and passage 129, passage 130, past the open valve 114 of the inshot valve device 4, valve chamber 115, passage 133, cavity 178 in the main slide valve 54 of the triple valve device and usual brake cylinder exhaust passage 64 leading to the usual retainer valve device (not shown) which is normally carried in cut-out position to permit the free discharge of fluid from the passage 64 to the atmosphere.

The small chamber 123 and the connected inshot valve piston chamber 122 are open to the atmosphere through a passage 179, a cavity 180 in the main emergency slide valve 88 and the passage 133 through which the brake cylinder is open to the atmosphere.

With the passage 130 and chamber 122 at atmospheric pressure, the spring 122 urges the inshot valve piston into engagement with the seat rib 120, and in this position, the outer seated area of the valve piston is open to the chamber 122 and consequently to the atmosphere through a passage 181.

The inner seated area of the timing valve 131 is open to the atmosphere through the passage 133, and the chamber 128 is also open to the atmosphere through passage 130 and brake cylinder passage 129. This permits quick action chamber pressure in diaphragm chamber 126 acting on the diaphragm 125 to hold the valve 131 in sealing engagement with the seat rib 132.

Fluid supplied from the brake pipe to the chamber 33 also flows to the vent valve chamber 110 in the valve device 5 through passage 111 and a passage 182. With the emergency valve device in release position, the auxiliary emergency slide valve 89 laps a quick action port 183 in the main slide valve 88, which port registers with a passage 184 open to the quick action piston chamber 105, and said chamber is open to the atmosphere by way of a restricted passage 185 through the quick action piston 104, chamber 106 and passage 107, and also by way of a leakage groove 186 around the quick action piston. With the chamber 105 thus at atmospheric pressure, fluid under pressure in the vent valve chamber 110 and a spring 187 act to maintain the vent valve closed.

Fluid under pressure supplied to passage 111 also flows to the chamber 143 of the check valve device 14 by way of passage 144, so that the check valves are balanced by fluid pressure, consequently the check valves 137 and 138 are held seated by the action of their respective springs 146 and 147.

Fluid under pressure supplied through the strainer 13 to the check valve chamber 139 flows to the chamber 149 in the quick service valve device 10 by way of passages 145 and 150 and at the same time fluid under pressure is supplied from the chamber 57 in the pipe bracket 12 to the diaphragm chamber 156 in the quick service valve device by way of passage 158, restriction 159, chamber 32 and passage 157. The pressures in chambers 149 and 156 are thus permitted to equalize so that the action of the spring-pressed member will hold the vent valve 148 closed.

This diaphragm chamber 165 of the quick service modifying valve device 11 is open to the atmosphere by way of the brake cylinder passage 129 so that the spring 162 acts to maintain the diaphragm 161 flexed outwardly and, through the medium of a valve stem, maintains the valve 168 open against the opposing pressure of the light spring 169.

With the triple valve device 1 in full release position, the quick service bulb 153 is open to the atmosphere by way of passage 154, choke plug 155 in this passage, passage 71 in the pipe bracket, passage 70 in the triple valve cap 38, passage 41 in the filler member 40, passages 47 and 43, cavity 62 in the main slide valve 54 and exhaust passage 63.

With the triple valve piston 52 in release position, the passage 80 is open to the piston chamber 50, so that fluid supplied to this chamber flows through the passage to the chamber 79 in the release insuring valve device 2. Fluid under pressure supplied to the passage 74 in the triple valve cap 38 flows to the diaphragm chamber 81 of the release insuring valve device. The diaphragm will be balanced by the pressure of fluid in the chambers 79 and 81 and the spring-pressed member 83 will act to hold the vent valve 78 seated.

With the equipment thus charged with fluid under pressure, a service application of the brakes is effected upon a gradual reduction in brake pipe pressure in the usual well known manner which results in a corresponding reduction in the pressure of fluid in the triple valve piston chamber 50, the emergency piston chamber 85, and valve chamber 149 in the quick service valve device 10.

Upon a light reduction in the pressure of fluid in the triple valve piston chamber 50, fluid under pressure in the slide valve chamber 56 shifts the triple valve piston 52 and thereby the auxiliary slide valve 55 toward the right hand and relative to the main slide valve 54. In thus moving, the piston 52 closes the feed groove 172 so as to prevent back flow of fluid under pressure from the valve chamber 56 to the piston chamber 50 and also closes the passage 80 so as to prevent back flow of fluid from the valve chamber 79 in the release insuring valve device 2, and the auxiliary slide valve laps the port 59 in the main slide valve to prevent back flow of fluid under pressure from the emergency reservoir 17 to the valve chamber 56 in the triple valve device. After the feed groove 172, passage 80 and port 59 have been closed, a shoulder 188 on the rear end of the piston stem 53 operatively engages the rear end of the main slide valve 54. The auxiliary slide valve 55 also uncovers the usual service port 189 in the main slide valve 54.

Upon a predetermined but light reduction in brake pipe pressure and consequently in the valve chamber 149 in the quick service valve device, fluid under pressure in the diaphragm chamber 156, as supplied from the chamber 32, acts to flex the diaphragm 146 inwardly which causes the quick service vent valve 148 to be unseated. With the vent valve 148 thus unseated, fluid under pressure is vented from the chamber 149 and consequently from the brake pipe to the quick service bulb 153 by way of passage 152. This produces a sudden limited local quick service reduction in brake pipe pressure for accelerating the movement of local triple valve parts to service application position and accelerates the movement of the triple valve parts and the operation of the quick service device on the next car of the train. Since the triple valve device and quick service valve device on each car of the train will operate in a similar manner, a quick serial response to the brake pipe reduction is transmitted from one car to the next throughout the length of the train.

It will here be noted that the quick service bulb is open to the atmosphere through passage 154, choke plug 155, passage 71 in the pipe bracket 12, passage 70 in the triple valve cap 38, passage 41 in the filler member 40, passages 47 and 43, cavity 62 in the main slide valve 54 and passage 63, but due to the choke plug 155 no appreciable initial quick service reduction in brake pipe pressure occurs by reason of this atmospheric connection, the initial reduction of brake pipe pressure to the quick service chamber 153 being adequate under normal conditions to insure the movement of the triple valve parts to service position. If, however, the triple valve parts should happen to stick or be sluggish in their movement so that they do not readily move to their brake applying position, the brake pipe pressure will continue to reduce through this connection so as to insure the movement of the parts to application position. It will here be noted that the communication from the quick service passage 71 to the atmosphere is unrestricted, so that brake cylinder pressure will not be built up by the flow of fluid locally vented from the brake pipe.

The initial quick service reduction in brake pipe pressure to the quick service bulb 153 is also effective in the triple valve piston chamber 50, so that the pressure of fluid in the valve chamber 56 causes the triple valve piston 52 to promptly move to service position, in which the piston engages the new gasket 49. It will here be understood that in the old triple valve device the piston 52 had an emergency position and that in this present equipment the gasket 49 stops the piston in service position. Just before the piston engages the gasket 49 the projection 69 on the piston engages the member 45 and while the piston continues to move toward its sealing engagement with the gasket, said projection shifts the member 45 toward the right hand against the opposing pressure of the spring 46.

After the shoulder 188 on the rear end of the piston stem 53 engages the rear end of the main slide valve 54, the piston shifts both slide valves to service position. The main slide valve in service position laps the passage 63 and a further reduction in brake pipe pressure is effected by the flow of fluid to the brake cylinder 18 by way of chamber 149 in the quick service valve device 10, past the open valve 148, passage 152, passage 154 and choke plug 155, past the ball check valve 170, passage 171, chamber 167 in the quick service modifying valve device 11, past the open valve 168, passage 166, diaphragm chamber 165, and passage and pipe 129. This final flow of fluid from the brake pipe to the brake cylinder is limited to a slow rate by the choke plug 155, the chief purpose of limiting the rate of flow being to dampen or smooth out surges of fluid under pressure in the brake pipe, which may have been caused by the initial sudden quick service venting of fluid from the brake pipe to the quick service bulb 153.

Further with both slide valves in service position, the service port 189 in the main slide valve 54 registers with the passage 133 and since, as before described, the auxiliary slide valve 55 has previously uncovered this port, fluid under pressure flows from the slide valve chamber 56 and connected auxiliary reservoir 16 to the brake cylinder by way of the service port 189, passage 133, valve chamber 115 in the inshot valve device 4, past the open inshot valve 114, a passage 190, which the valve 114 controls, passage 130 and passage and pipe 129, thus an application of the brakes is initiated.

Now when the brake cylinder pressure has been increased to a predetermined degree, say for instance to ten pounds, fluid at brake cylinder pressure in the diaphragm chamber 165 of the quick service modifying valve device 11 will cause the diaphragm 161 to flex inwardly and upon the flexing of the diaphragm, the action of the spring 169 will seat the modifying valve 168 and close communication from the modifying valve chamber 167 to the diaphragm chamber 165, consequently closing off the final quick service flow of fluid from the brake pipe to the brake cylinder.

It is desirable that the final quick service reduction in brake pipe pressure be continued until the aforementioned predetermined brake cylinder pressure is developed, so that the quick service valve device must remain open for a predetermined time after the triple valve parts have been shifted to service application and in order to insure against the premature operation of the quick service valve device to close off the quick service flow of fluid from the brake pipe to the brake cylinder, I provide the volume chamber 32 and choke 159 in the passage 158 to prevent the pressure of fluid in the chamber 156 in the quick service valve device from reducing at as fast a rate as the auxiliary reservoir pressure is reducing by the flow of fluid to the brake cylinder. By thus providing a volume chamber 32 and controlling the flow of fluid therefrom to the auxiliary reservoir, by means of the choke 159, the quick service valve device 10 will be maintained in quick service venting position for a predetermined period of time. Now when the pressure of fluid in the diaphragm chamber 156 has been reduced by the flow of fluid therefrom to the auxiliary reservoir, by way of the choke 159, to substantially that of the brake pipe pressure in chamber 149, the spring-pressed member 151 acts to again seat the vent valve 148, thus closing off communication from the chamber 149 to the quick service bulb 153.

In effecting a service application of the brakes, fluid at the pressure supplied through the passage 133 to the brake cylinder 18, also flows from said passage through the cavity 180 in the main emergency slide valve 88 to the small chamber 123 by way of passage 179, and then flows from said chamber through passage 124 to the valve piston chamber 122, and from the chamber 122 flows to the outer seated area of the valve piston by way of passage 181. The inner seated area of the valve piston is subject to the pressure of fluid from the passage 133, so that the fluid under pressure acting on opposite sides of the valve piston is substantially equal. Due to this, the spring 121, acting through the medium of the valve piston and projection 119, maintains the inshot valve 14 open as shown in the drawing.

Upon a service reduction in pressure in the emergency piston chamber 85, the emergency piston 86 and auxiliary slide valve 89 are shifted toward the right hand relative to the main slide valve 88, by fluid under pressure in the valve chamber 90, as supplied from the quick action chamber 31 by way of passage 91, the piston closing the port 92. This movement of the auxiliary slide valve 89 brings a port 191 in said valve into registration with a port 192 in the main slide valve 88 open to a cavity 193 in the valve 88 which is open to an atmospheric passage 194, so that fluid under pressure is vented from the emergency valve chamber 90 and connected quick action chamber 31. The rate at which the pressure of fluid is thus reduced in valve chamber 90 is substantially the same as the service rate of reduction in the pressure of fluid in the emergency piston chamber 85, so that the operating pressure differential is substantially destroyed and the piston consequently comes to rest. When the piston thus comes to rest the plunger 101, carried by the rear end portion of the emergency piston stem 87, will have just engaged the rear end of the main emergency slide valve 88, and will resist any tendency of the piston and auxiliary slide valve to move from their normal service position.

In effecting an application it is desired to gather the slack in the train as gently as possible and to accomplish this, it is the practice to make an initial light reduction in brake pipe pressure and after the slack has been gathered to make a second heavier reduction in brake pipe pressure. Upon effecting the initial light reduction in brake pipe pressure, the several parts of the equipment operate to service application position in the same manner as just described. Now, when the auxiliary reservoir pressure in the valve chamber 56 of the triple valve device 1 is reduced, by the flow of fluid therefrom to the brake cylinder 18, an amount substantially equal to the degree of brake pipe reduction in the triple valve piston chamber 50, the triple valve piston 52 and auxiliary slide valve 55 are moved toward the left hand from service position to service lap position, in which a lug 195 on the triple valve piston stem engages the front end of the main slide valve 54 and stops the movement of the piston and auxiliary slide valve 55. This movement is initiated by the inwardly directed pressure of the spring 46 acting through the medium of the movable member 45 and projection 69 on the piston 52. It will thus be seen that the spring 46 acts to break the seal between the piston 52 and the gasket 49 and thus quickly exposes the entire area of the face of the piston to the pressure of fluid in the piston chamber 50. After the piston seal is thus broken, a slight pressure differential on said piston, caused by the pressure in valve chamber 56 reducing slightly below the brake pipe pressure in piston chamber 50, causes the piston and auxiliary slide valve to move to lap position, in which said slide valve laps the service port 187 and prevents further flow of fluid under pressure from the auxiliary reservoir to the brake cylinder and in which the charging port 65 in the main slide valve 54 is maintained lapped.

When the degree of brake pipe reduction is thus limited, the quick action chamber pressure in the emergency valve chamber 90 continues to reduce to the atmosphere through the communication established by the main and auxiliary emergency slide valves, until the pressure in the chamber is slightly below the brake pipe pressure in the emergency piston chamber 85, at which time the pressure differential created on the piston 86 causes the piston and auxiliary slide valve 89 to move back to release position as shown in the drawing, in which the communication between the valve chamber 90 and the atmosphere is disestablished, thus preventing further reduction in the pressure of fluid in the emergency valve chamber 90.

It will here be noted that upon initiating a light reduction in brake pipe pressure to effect a light application of the brakes, the quick service modifying valve device 11 operates according to a predetermined brake cylinder pressure to limit the quick service venting of fluid under pressure from the brake pipe and consequently provides for a uniform brake cylinder pressure throughout the length of the train, which, as fully described in McClure's prior application before mentioned, insures the gentle gathering of the train slack.

When it is desired to increase the brake cylinder pressure, a further reduction in brake pipe pressure is effected, causing the triple valve piston 52 and auxiliary slide valve 55 to move to service application position, and also causing the emergency piston 86 and auxiliary slide valve 89 to move to service position. This further reduction in brake pipe pressure is also effective in the valve chamber 149, so that diaphragm 146 will be flexed to again unseat the valve 143, but since the quick service modifying valve device 11 will have been closed during the initial application of the brakes, and further since the main slide valve 54 maintains the passage 63 lapped, no quick service activity will occur.

To effect the release of the brakes after an application, fluid under pressure is supplied to the brake pipe 15 and flows from the brake pipe to the several parts of the equipment in the same manner as before described in initially charging the equipment.

In supplying fluid under pressure to the brake pipe to effect a release of the brakes, it is customary to initially turn the usual brake valve device (not shown) to release position in which fluid under pressure is supplied directly from the main reservoir (not shown) through the brake valve device to the brake pipe and then, after a predetermined interval of time, which is varied according to the length of the train, the brake valve device is turned to running position, in which latter position, the pressure of fluid supplied to the brake pipe is reduced, by the usual feed valve device (not shown), to that normally carried in the brake pipe.

The initial supply of fluid at high pressure to the brake pipe rapidly increases the brake pipe pressure on the cars at the front end of the train and at or near the locomotive the brake pipe pressure may be increased to substantially that carried in the main reservoir. This high head of pressure at the front end of the train is adapted to cause a rapid flow of fluid under pressure toward the rear of the train, which serves to accelerate the release of the brakes and the charging of the brake equipment on the cars at the rear end of the train.

The rapid increase in brake pipe pressure on the cars at the front end of the train builds up a pressure differential on the triple valve piston 52, which causes the piston to move to retarded release position, compressing the retarded release spring 68.

In the retarded release position of the triple valve device, the rate at which fluid under pressure is permitted to flow from the piston chamber 50 to the valve chamber 56 is restricted by a portion 201 of the feed groove, which portion 201 has a smaller flow area than the other portion of the groove. With the slide valves 54 and 55 in retarded release position, fluid under pressure is supplied from the fully charged emergency reservoir 17 to the auxiliary reservoir 16 by way of pipe and passage 73, passage 72 in the triple valve cap 38, choke 173, passage 61 in the casing 23, cavity 60 and port 59 in the main slide valve 54. Since the flow of fluid from the brake pipe to the auxiliary reservoir 16 is thus restricted and fluid under pressure is supplied from the emergency reservoir to the auxiliary reservoir, only a small amount of fluid will flow from the brake pipe to the auxiliary reservoir, consequently a greater amount of fluid will flow toward the rear of the train than would otherwise be the case.

In retarded release position, the brake cylinder 18 is open to the atmosphere through pipe and passage 129, passage 140, passage 190 in the inshot valve device 4, past the unseated inshot valve 114, valve chamber 115, passage 133, cavity 178 in the main slide valve 54, a retarded release choke 202, and connected cavity 203 in the main slide valve, and through the restricted exhaust passage 64 leading to the usual retaining valve device. As a consequence, fluid under pressure is vented from the brake cylinder at a slow rate as controlled by the retarded release choke 202, thus providing for a slow release of the brakes at the head end of the train.

With the passage 129 thus open to the atmosphere, fluid under pressure in the diaphragm chamber 165 of the quick service modifying valve device 11 is vented to the atmosphere and when the pressure of fluid in this chamber is reduced to a degree less than the pressure of the spring 163, said spring acts to deflect the diaphragm 161 inwardly, thereby unseating the poppet valve 168 against the opposing pressure of the light spring 169. This opens communication between the quick service bulb and the brake cylinder passage 129.

With the main slide valve 54 of the triple valve device in retarded release position, fluid under pressure is vented from the quick service bulb 153 to the atmosphere, through passage 154, choke 155, passage 71, passage 70 in the triple valve cap 38, passages 41, 42 and 43, cavity 62 in the main slide valve 54 and passage 63.

In releasing the brakes after the brake valve device is moved from release to running position, and the pressures on opposite sides of the triple valve piston 52 become substantially equal, the retarded release spring 68 will act to shift the piston 52 and slide valves 54 and 55 from retarded release position to full release position. With the piston in this position the portion of the feed groove 172 having the larger flow area connects the piston chamber 50 to the valve chamber 56.

With the slide valves 54 and 55 in full release position, fluid under pressure may continue to flow from the emergency reservoir 17 to the valve chamber 56 of the triple valve device 1 and to the auxiliary reservoir 16 by way of the port 59 in the main slide valve 54, but after equalization of the pressures in both of said reservoirs, fluid under pressure supplied through the feed groove 172 to the valve chamber 56 completes the charging of the auxiliary reservoir up to the pressure carried in the brake pipe. As the auxiliary reservoir pressure is thus built up, fluid under pressure flows from the valve chamber 56 to the emergency reservoir 17 by way of the port 59 in the main slide valve 54, passage 61, choke plug 173, passage 72 in the triple valve cap 38 and passage and pipe 73.

In the full release position of the main slide valve 54, passage 133 leading from the brake cylinder is open directly through cavity 178 in the main slide valve 54 to the release passage 64 leading to the retaining valve device, so that the final release of fluid under pressure from the brake cylinder is at the normal rate.

In this position of the main slide valve the quick service bulb 153 is open to the atmosphere through passage 43, cavity 62 in the main slide valve 54 and exhaust passage 63, which latter passage is separate from the passage 64 leading to the retaining valve device.

In releasing the brakes after a service application, the relatively slow rate of increase in brake pipe pressure at the rear end of the train causes the triple valve device to move to full release position, but the flow of fluid from the piston chamber 50 to the valve chamber 56 by way of the feed groove 172, will be such that sufficient differential on the piston 52 will not be created on the piston to move it to retarded release position against the pressure of the retarded release spring 68, consequently there will be no retarding of the release of the brakes at the rear end of the train, as occurs at the front end of the train where the triple valves are in retarded release position.

To effect an emergency application of the brakes, fluid under pressure is suddenly vented from the brake pipe 15 and the connected triple valve and emergency valve chambers 50 and 85 respectively. With the triple valve piston chamber 50 thus vented, the triple valve device operates to supply fluid under pressure from the auxiliary reservoir 16 to the brake cylinder 18 in the same manner as described in connection with the effecting of a service application of the brakes.

At substantially the same time as the triple valve device operates upon an emergency reduction in brake pipe pressure, the emergency valve device operates to first effect the operation of the emergency vent valve device 5 to locally vent fluid under pressure from the brake pipe and to then supply fluid under pressure from the emergency reservoir 17 to the brake cylinder in substantially the same manner as fully described in the first mentioned pending application, the rate of flow of fluid to the brake cylinder being controlled by the operation of the inshot valve device 4 and the timing valve device 6 in substantially the same manner, as fully described in said pending application. Briefly described, the initial inshot of fluid to the brake cylinder is at a fast rate past the unseated valve 114 and through passages 190 and 130 and passage and pipe 129. When the pressure of fluid in passage 190 and acting on the inner seated area of the inshot valve piston 118, becomes great enough to overcome the opposing force of the spring 121, said valve piston moves from its seated position, permitting the spring 117 to act to seat the inshot valve 114. With the valve 114 thus seated, the flow of fluid to the brake cylinder continues by way of a choke passage which connects the valve chamber 115 to the passage 130 leading to the brake cylinder. Now when the pressure of fluid in chamber 128 of the timing valve device 6 and in passage 133, acting on one side of the timing diaphragm 125, is sufficient to overcome the fluid at quick action chamber pressure in chamber 126, the diaphragm 125 will flex and cause the timing valve 131 to be unseated. With the valve 131 unseated, fluid under pressure now flows at a fast rate from the passage 133, past the unseated valve 131 and passage 130 to the brake cylinder. The brake cylinder pressure continues to build up at this final fast rate to equalization with the pressures of fluid in the auxiliary reservoir and emergency reservoir.

To effect the release of the brakes after an emergency application, fluid under pressure is supplied to the brake pipe 15 and flows to the triple valve piston chamber 50 and to the emergency valve piston chamber 85. Fluid under pressure supplied to the emergency piston chamber 85 causes the emergency valve device to operate in substantially the same manner as described in connection with the emergency valve device in the first mentioned pending application to hasten the charging of the equipment and consequent release of the brakes. Fluid under pressure supplied to the triple valve piston chamber 50 causes the triple valve device to operate to release position in the same manner as before described in connection with the release of the brakes after a service application. The releasing operations of the emergency valve device and the triple valve device are briefly described as follows.

When the brake pipe pressure is increased to effect the release of the brakes after an emergency application, the several parts of the emergency valve device are moved to their innermost or back-dump position, in which a cavity 180 in the emergency main slide valve 88 connects the passage 133 to the passage 182. Since the auxiliary reservoir 16 is open to the passage 133 by way of pipe and passage 58, chamber 57, valve chamber 56 and port 189 in the main slide valve 54 of the triple valve device, and further since the brake cylinder 18 is connected to the passage 133 by way of pipe and passage 129, passage 130 and past the open timing valve 131, fluid under pressure flows from the auxiliary reservoir and brake cylinder to the brake pipe, thus charging the brake pipe at a rapid rate.

After the brake pipe pressure is thus rapidly increased by the flow of fluid from the auxiliary reservoir and brake cylinder, it continues to be charged in the usual manner. At the head end of the train, the supply of fluid under pressure to the brake pipe, through the usual brake valve device (not shown) in release position, moves the triple valve piston 52 and therefore the slide valves 54 and 55 to their innermost or retarded release position, in which the release of the fluid under pressure remaining in the brake cylinder is retarded by the choke 202 in the main slide valve 54, and fluid at the reduced pressure in the emergency reservoir 17 flows back and equalizes into the auxiliary reservoir by way of pipe and passage 73, passage in the choke plug 173, passage 61, port 59 in the main slide valve 54, valve chamber 56, chamber 57 and passage and pipe 58, after which both reservoirs are charged with fluid under pressure supplied from the brake pipe by way of the feed groove around the triple valve piston. With the triple valve device in this position the quick service chamber 153 is open to the atmosphere by way of passage 154, the passage in the choke plug 155, passages 71, 70 and 41, chamber 42, passage 43, cavity 62 in the main slide valve 54 and passage 63.

On the cars at the rear end of the train the triple valve parts, due to the slower increase in brake pipe pressure, may not move to back dump position and may come to a stop in normal release position as shown in the drawing, in which case the choke 202 will not control the release of fluid under pressure from the brake cylinder. Otherwise the communications established by the triple valve device are the same as those established with the triple valve parts in retarded release position.

Upon the substantial equalization of the pressures of fluid on opposite sides of the emergency piston 86, the spring 96 acts to return the emergency valve parts to their normal position as shown, and upon the substantial equalization of the pressures of fluid on opposite sides of the piston 52, of a triple valve device which has been operated to retarded release position, the triple valve parts will be returned to their normal release position by the action of the spring 68.

In controlling a train on a descending grade, it is customary to cycle the brakes, i. e., to alternately effect an application of the brakes and then recharge the brake equipment while a partial release of the brakes is taking place through the retaining valve device, which will have been turned to its pressure retaining position preparatory to descending the grade.

In effecting the first service application of the brakes on the descending grade, the operation of the several parts and devices of the equipment will be the same as before described in connection with effecting of a service application with the retaining valve device turned to the position in which it permits the full release of the brakes.

Now when the brake pipe pressure is increased, the triple valve device will be caused to operate to release position in the same manner as before described in connection with the release of the brakes after a service application.

With the main slide valve 54 of the triple valve device in release position, fluid under pressure is vented from the brake pipe to the atmosphere, in the same manner as before described, until the brake cylinder pressure has been reduced to approximately twenty pounds, when the retaining valve device operates to prevent any further flow of fluid from the brake cylinder. Further with the main slide valve 54 in this position, fluid under pressure is vented from the quick service bulb 153 to the atmosphere by way of passage 43, cavity 62 in the main slide valve and atmospheric passage 63.

Fluid at the retained brake cylinder pressure present in the diaphragm chamber 165 of the quick service modifying valve device 11 is sufficiently high to maintain the diaphragm 161 flexed outwardly against the opposing pressure of the spring 162 so that the valve 168 is maintained seated.

After the equipment is recharged a reduction in brake pipe pressure is effected, causing the quick service valve device to operate to locally vent fluid under pressure from the brake pipe to the quick service bulb 153, thus effecting a sharp but limited local reduction in brake pipe pressure the same as before described in connection with a service application, causing the triple valve devices to move to application position.

It will here be noted that since the modifying valve 168 is maintained closed no local venting of fluid under pressure from the brake pipe to the brake cylinder is permitted while the quick service valve device 10 remains in open position in effecting a reapplication of the brakes in cycling.

When desired another partial release of the brakes and a recharge of the equipment may be effected, which may be followed by another application of the brakes, and this alternate operation may continue as long as desired, after which a complete release of the brakes may be effected by turning the retaining valve device to its normal cut-out position and then recharging the equipment in the same manner as in releasing after a service application.

It will be understood that by modifying the usual type of triple valve device now in use in the manner before described, that it is adapted to be used in the new type of equipment as described in this specification.

It will also be understood that instead of controlling the local quick service venting of fluid under pressure from the brake pipe through the medium of the triple valve device 1, I provide the quick service valve device 10, which is separate from the triple valve device and which will operate independently of the triple valve device. This device is subject to variations in the opposing pressures of the brake pipe and a chamber 32, so that when a reduction in brake pipe pressure is effected through the use of the brake valve device, the vent valve 148 will open to locally discharge fluid under pressure from the brake pipe and will remain open for a predetermined period of time after the triple valve device is moved to application position, the duration of said period of time being determined by the size of the chamber 32 and the rate at which the restriction 159 in the passage 158 permits fluid to flow back from the chamber 32 to the auxiliary reservoir, in which the pressure is reducing by the flow of fluid to the brake cylinder. When the valve is opened, the initial portion of the reduction will be at a fast rate, but limited according to the size of the bulb 153, and the final portion of the reduction will be at a slower rate as governed by the choke 155, the amount of reduction being limited by the quick service modifying valve device 11, which operates according to a predetermined brake cylinder pressure to cut off the local flow of fluid from the brake pipe.

It is to be understood that while the operating characteristics of the equipment of the present application are quite similar to those of the equipment of my aforementioned pending application, the means for imparting such characteristics to the equipments differ in many respects. However, certain features which relate to both equipments, such as the controlled build up of brake cylinder pressure in effecting an emergency application of the brakes, the supplying of fluid under pressure from the brake cylinder to the brake pipe in releasing the brakes, the release insuring feature, and the control of the quick service venting of fluid from the brake pipe in effecting an application of the brakes, are broadly covered in said pending application, the claims of the present application being limited to cover only those features not present in the equipment disclosed in said pending application.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe and means operative to locally vent fluid under pressure from the brake pipe, of a triple valve device comprising a salvaged casing having a chamber from which a quick action mechanism has been removed and which is open at one end, an annular gasket in said chamber carried by said casing, said gasket having a beveled inner surface, a member in said chamber having a beveled surface adapted to engage the beveled surface of said gasket to form an air-tight seal between said casing and member, and a cap secured to said casing clamping said member in engagement with said gasket and closing the open end of said chamber, said casing, member and cap defining a passage through which fluid under pressure vented from the brake pipe is adapted to flow.

2. A triple valve device comprising a salvaged casing having a chamber from which a quick action mechanism has been removed, the wall of said chamber having an annular groove formed therein interiorly of the chamber, an annular gasket mounted in said casing within said groove, a member in said chamber, and a cap secured to said casing clamping said member in close engagement with said gasket, and closing the open end of said chamber, said casing, member and cap defining a fluid conducting passage.

3. In a fluid pressure brake, the combination with a brake pipe, a reservoir into which fluid under pressure is adapted to be locally vented from the brake pipe, means operative to vent fluid under pressure from the brake pipe to said reservoir, and a passage through which fluid under pressure is adapted to be vented from said reservoir, of a triple valve device comprising a salvaged casing having a chamber from which a quick action mechanism has been removed and which is open at one end, a member in said chamber, a cap secured to said casing clamping said member to said casing and closing the open end of said chamber, said casing, member and cap defining at least a portion of the passage through which fluid is adapted to be vented from said reservoir.

4. In a fluid pressure brake equipment, the combination with a brake pipe, a brake cylinder and means operative to locally vent fluid under pressure from the brake pipe, of a triple valve device comprising a salvaged casing having a chamber from which a quick action mechanism has been removed and which is open at one end, said casing having a brake cylinder passage through which fluid under pressure is adapted to be supplied to and released from the brake cylinder and which is open to said chamber, a member in said casing, a cap secured to said casing clamping said member to said casing and closing the open end of said chamber, said casing, member and cap defining a passage through which fluid under pressure locally vented from the brake pipe is adapted to flow, a gasket forming an air-tight seal between said casing and member, a gasket forming an air-tight seal between said member and cap, said air-tight seals preventing leakage of fluid under pressure from one of said passages to the other, and means included in the triple valve device normally establishing a connection from the brake cylinder passage to the atmosphere and also normally establishing a separate connection from the second mentioned passage to the atmosphere.

5. In a fluid pressure brake equipment, the combination with a brake pipe, a brake cylinder and means operative to locally vent fluid under pressure from the brake pipe, of a triple valve device comprising a salvaged casing having a chamber from which a quick action mechanism has been removed and which is open at one end, said casing having a brake cylinder passage through which fluid under pressure is adapted to be supplied to and released from the brake cylinder and which is open to said chamber, a member in said casing, a cap secured to said casing clamping said member to said casing and closing the open end of said chamber, said casing, member and cap defining a passage through which fluid under pressure locally vented from the brake pipe is adapted to flow, a gasket forming an air-tight seal between said casing and member, a gasket forming an air-tight seal between said member and cap, said air-tight seals preventing leakage of fluid under pressure from one of said passages to the other, and means included in the triple valve device normally establishing a connection from the brake cylinder passage to the atmosphere and also normally establishing a separate connection from the second mentioned passage to the atmosphere, said means being operative upon a reduction in brake pipe pressure to disestablish both of said connections to the atmosphere and to establish another connection through which fluid under pressure is supplied to the brake cylinder passage.

6. In a fluid pressure brake equipment, the combination with a brake pipe, an auxiliary reservoir and an emergency reservoir, of a triple valve device comprising a salvaged casing having a chamber from which a quick action mechanism has been removed and which is open at one end, said casing also having a passage which was formerly a quick service passage, means included in the triple valve device adapted in a brake releasing position of the triple valve device to establish communication between said passage and auxiliary reservoir, and a cap secured to said casing closing the open end of said chamber and having a passage connecting the emergency reservoir and first mentioned passage.

7. A triple valve device comprising a casing having a piston chamber which is open at one end, a cap closing the open end of said chamber, a piston in said chamber adapted to be reciprocated, and a gasket interposed between said casing and cap, a portion of said gasket being thickened and constituting a stop for limiting the traverse of said piston in one direction.

8. A triple valve device comprising a casing having a piston chamber which is open at one end, a cap closing the open end of said chamber, a piston in said chamber adapted to be reciprocated, and a gasket interposed between said casing and cap having a portion clamped between said casing and cap and also having a portion extending into said chamber and engaging the inner surface of the wall of the chamber, the last mentioned portion of the gasket constituting a stop for limiting the traverse of said piston in one direction.

9. A triple valve device comprising a casing having a piston chamber which is open at one end, a cap closing the open end of said chamber, a piston in said chamber adapted to be reciprocated, and a gasket interposed between said casing and cap having an annular portion extending into said chamber and engaging the inner surface of the wall of the chamber, said annular portion of the gasket constituting a stop for said piston for limiting the travel of said piston in one direction.

10. A triple valve device comprising a salvaged casing having a piston chamber which is open at one end, a salvaged cap closing the open end of said chamber, a salvaged piston in said chamber adapted to be reciprocated, said piston formerly having a service brake application position and an emergency application position, and a gasket interposed between said casing and cap adapted to prevent said piston from moving to its former emergency position.

11. A triple valve device comprising a salvaged casing having a piston chamber which is open at one end, a salvaged cap closing the open end of said chamber, a salvaged piston in said chamber adapted to be reciprocated, said piston formerly having a service brake application position and an emergency application position, and a gasket interposed between said casing and cap for stopping and maintaining said piston in service position against movement to its former emergency position.

12. A triple valve device comprising a casing having a piston chamber which is open at one end, a cap closing the open end of said chamber, a piston in said chamber adapted to be reciprocated, and a gasket interposed between said casing and cap, having a portion extending into said chamber and engaging the inner surface of the wall of the chamber and with which the piston is adapted to engage at one end of its travel, the engagement of the gasket with the wall of the chamber preventing deformation of the gasket.

13. A triple valve device comprising a salvaged casing having a piston chamber which is open at one end, a salvaged cap closing the open end of said chamber, a salvaged piston in said chamber adapted to be reciprocated, said piston formerly having a service brake application position and an emergency position, a gasket between said casing and cap adapted to stop and maintain said piston in service position against movement to its former emergency position, and a salvaged graduating mechanism mounted in said cap tending to urge said piston out of engagement with said gasket when the piston is in service position.

14. A triple valve device comprising a salvaged casing having a piston chamber which is open at one end, a salvaged cap closing the open end of said chamber, a salvaged piston in said chamber adapted to be reciprocated, said piston formerly having a service brake application position and an emergency position, a gasket between said casing and cap adapted to stop and maintain said piston in service position against movement to its former emergency position, and means carried by said cap tending to urge said piston away from said gasket, said means being energized just prior to the piston being moved into engagement with said gasket.

15. In a fluid pressure brake equipment, the combination with a brake pipe, a brake cylinder and a brake controlling valve device operated upon a reduction in brake pipe pressure for supplying fluid under pressure to the brake cylinder to effect an application of the brakes, of means separate from said brake controlling valve device operated independently of the brake controlling valve device upon a reduction in brake pipe pressure for effecting a local reduction in brake pipe pressure at two different rates, and means subject to brake cylinder pressure and operated upon the development of a predetermined brake cylinder pressure for limiting said local reduction.

16. In a fluid pressure brake equipment, the combination with a brake pipe, a brake cylinder and a brake controlling valve device operated upon a reduction in brake pipe pressure for supplying fluid under pressure to the brake cylinder to effect an application of the brakes, of means separate from said brake controlling valve device operated independently of the brake controlling valve device upon a reduction in brake pipe pressure for effecting a local reduction in brake pipe pressure at two different rates, and a valve device operated according to brake cylinder pressure to limit the extent of said local reduction.

17. In a fluid pressure brake equipment, the combination with a brake pipe, a brake cylinder and a brake controlling valve device operated upon a reduction in brake pipe pressure for supplying fluid under pressure to the brake cylinder to effect an application of the brakes, of a valve device separate from said brake controlling valve device and operated independently of the brake controlling valve device upon a reduction in brake pipe pressure for venting fluid under pressure from the brake pipe to effect a local reduction in brake pipe pressure, and means subject to a predetermined brake cylinder pressure for limiting said local reduction.

18. In a fluid pressure brake equipment, the combination with a brake pipe, a brake cylinder and a brake controlling valve device operated upon a reduction in brake pipe pressure for supplying fluid under pressure to the brake cylinder to effect an application of the brakes, of a valve device separate from said brake controlling valve device and operated independently of the brake controlling valve device upon a reduction in brake pipe pressure for venting fluid under pressure from the brake pipe to effect a local reduction in brake pipe pressure, a normally open valve past which fluid under pressure locally vented from the brake pipe is adapted to flow, and means operating upon the development of a predetermined brake cylinder pressure to close said valve to prevent the further flow of fluid under pressure from the brake pipe.

19. In a fluid pressure brake equipment, the combination with a brake pipe, a brake cylinder and a brake controlling valve device operated upon a reduction in brake pipe pressure for supplying fluid under pressure to the brake cylinder to effect an application of the brakes, of a valve device separate from said brake controlling valve device and operated independently of the brake controlling valve device upon a reduction in brake pipe pressure for venting fluid under presure from the brake pipe to effect a local reduction in brake pipe pressure, a normally open valve past which fluid under pressure locally vented from the brake pipe is adapted to flow to the brake cylinder, and means operating according to a predetermined brake cylinder pressure for closing said valve to close off the further flow of fluid under pressure from the brake pipe to the brake cylinder.

20. In a fluid pressure brake equipment, the combination with a brake pipe, an auxiliary reservoir, a brake cylinder and a brake controlling valve device operated upon a reduction in brake pipe pressure to supply fluid under pressure from the auxiliary reservoir to the brake cylinder, of a reservoir charged through a restricted passage with fluid under pressure from the auxiliary reservoir, and means subject to the opposing pressures of the second mentioned reservoir and the brake pipe and operative upon a reduction in brake pipe pressure to effect a local reduction in brake pipe pressure, said restricted passage preventing back flow of fluid from the second mentioned reservoir to the auxiliary reservoir at as fast a rate as fluid flows from the auxiliary reservoir to the brake cylinder in effecting an application of the brakes for maintaining said means in brake pipe venting position for a predetermined period of time.

21. In a fluid pressure brake equipment, the combination with a brake pipe, an auxiliary reservoir, a brake cylinder and a brake controlling valve device operated upon a reduction in brake pipe pressure to supply fluid under pressure from the auxiliary reservoir to the brake cylinder, of a reservoir, a passage connecting both of said reservoirs and through which the second mentioned reservoir is charged with fluid under pressure from the auxiliary reservoir, means subject to the opposing pressures of the second mentioned reservoir and the brake pipe and operable upon a reduction in brake pipe pressure for locally venting fluid under pressure from the brake pipe, and means in said passage for preventing back flow of fluid from the second mentioned reservoir to the auxiliary reservoir at as fast a rate as fluid flows from the auxiliary reservoir to the brake cylinder in effecting an application of the brakes.

22. In a fluid pressure brake equipment, the combination with a brake pipe, an auxiliary reservoir, a brake cylinder and a brake controlling valve device operated upon a reduction in brake pipe pressure to supply fluid under pressure from the auxiliary reservoir to the brake cylinder, of a chamber connected to said auxiliary reservoir and charged with fluid under pressure from the auxiliary reservoir, valve means subject to the opposing pressures of said chamber and brake pipe and operable upon a reduction in brake pipe pressure for locally venting fluid under pressure from the brake pipe, and means for governing back flow of fluid from said chamber to said auxiliary reservoir, when the pressure of fluid in the auxiliary reservoir is being reduced by flow to the brake cylinder, to maintain said valve means in venting position for a predetermined period of time.

23. In a fluid pressure brake equipment, the combination with a brake pipe, an auxiliary reservoir, a brake cylinder and a brake controlling valve device operated upon a reduction in brake pipe pressure to supply fluid under pressure from the auxiliary reservoir to the brake cylinder, of a chamber charged with fluid under pressure from the auxiliary reservoir, valve means subject to the opposing pressures of said chamber and brake pipe operative upon a reduction in brake pipe pressure to establish communication, for a predetermined period of time after the brake controlling valve device is in application position, through which fluid under pressure is locally vented from the brake pipe to effect a reduction in brake pipe pressure, and means operated according to the brake cylinder pressure to limit the local reduction in brake pipe pressure.

24. In a fluid pressure brake equipment, the combination with a brake pipe, a brake cylinder and a triple valve device comprising a main valve and an auxiliary valve having a movement relative to the main valve and a piston operated upon a reduction in brake pipe pressure for actuating said valves to effect an application of the brakes, of means operated upon a reduction in brake pipe pressure for locally venting fluid under pressure from the brake pipe, means in said main valve normally establishing communication through which fluid vented from the brake pipe is adapted to flow to the atmosphere and operative upon movement of said main valve toward application position for closing said communication, and a passage through which fluid under pressure vented from the brake pipe flows to the brake cylinder after said communication is closed.

25. In a fluid pressure brake equipment, the combination with a brake pipe, a brake cylinder and a triple valve device comprising a main valve and an auxiliary valve having a movement relative to the main valve and a piston operated upon a reduction in brake pipe pressure for actuating said valves to effect an application of the brakes, of a quick service bulb, means in said main valve normally connecting said bulb to the atmosphere, means operated upon a reduction in brake pipe pressure to locally vent fluid under pressure from the brake pipe to said bulb, the atmospheric connection from said bulb being closed upon the movement of said main valve to application position, and a passage through which fluid under pressure vented from the brake pipe flows to the brake cylinder after the atmospheric connection is closed.

26. In a fluid pressure brake equipment, the combination with a brake pipe, a brake cylinder and a triple valve device comprising a main valve and an auxiliary valve having a movement relative to the main valve and a piston operated upon a reduction in brake pipe pressure for actuating said valves to effect an application of the brakes, of a quick service bulb, means in said main valve normally connecting said bulb to the atmosphere, means operated upon a reduction in brake pipe pressure to locally vent fluid under pressure from the brake pipe to said bulb, the atmospheric connection from said bulb being closed upon the movement of said main valve to application position, a passage through which fluid under pressure vented from the brake pipe flows to the brake cylinder after the atmospheric connection is closed, and means operated according to a predetermined brake cylinder pressure to close off the flow of fluid through said passage.

27. In a fluid pressure brake equipment, the combination with a brake pipe, a brake cylinder and a triple valve device comprising a main valve and an auxiliary valve having a movement relative to the main valve and a piston operated upon a reduction in brake pipe pressure for actuating said valves to effect an application of the brakes, of a quick service bulb, means in said main valve normally connecting said bulb to the atmosphere, means operated upon a reduction in brake pipe pressure to locally vent fluid under pressure from the brake pipe to said bulb, the atmospheric connection from said bulb being closed upon the movement of said main valve to application position, a passage through which fluid under pressure vented from the brake pipe flows to the brake cylinder after the atmospheric connection is closed, and a valve device operated upon the development of a predetermined brake cylinder pressure for closing off the flow of fluid from said brake pipe to the brake cylinder.

28. In a fluid pressure brake equipment, the combination with a brake pipe, a brake cylinder and a brake controlling valve device operated upon a reduction in brake pipe pressure for supplying fluid under pressure to the brake cylinder to effect an application of the brakes, of a valve device operated independently of the brake controlling valve device upon a reduction in brake pipe pressure for venting fluid under pressure from the brake pipe to a chamber, said chamber being normally open to the brake cylinder through a restricted port for retarding the rate of flow of fluid from the brake pipe to said chamber after the brake pipe pressure equalizes into said chamber.

29. In a fluid pressure brake equipment, the combination with a brake pipe, a brake cylinder and a brake controlling valve device operated upon a reduction in brake pipe pressure for supplying fluid under pressure to the brake cylinder to effect an application of the brakes, of a valve device operated independently of the brake controlling valve device upon a reduction in brake pipe pressure for venting fluid under pressure from the brake pipe to a chamber, said chamber being normally open to the brake cylinder through a restricted port for retarding the rate of flow of fluid from the brake pipe to said chamber after the brake pipe pressure equalizes into said chamber, and means operated upon the development of a predetermined brake cylinder pressure to close communication from said chamber to the brake cylinder.

30. In a fluid pressure brake equipment, the combination with a brake pipe, a brake cylinder and a brake controlling valve device operated upon a reduction in brake pipe pressure for supplying fluid under pressure to the brake cylinder to effect an application of the brakes, of a valve device operated independently of the brake controlling valve device upon a reduction in brake pipe pressure for venting fluid under pressure from the brake pipe to a chamber, said chamber being open through a restricted port to a passage normally communicating with the brake cylinder, said restricted port being adapted to retard the rate of flow of fluid from the brake pipe to said chamber after the brake pipe pressure equalizes into said chamber, and said passage being open to the atmosphere in the release position of the brake controlling valve device.

31. In a fluid pressure brake equipment, the combination with a brake pipe, a brake cylinder and a brake controlling valve device operated upon a reduction in brake pipe pressure for supplying fluid under pressure to the brake cylinder to effect an application of the brakes, of a valve device operated independently of the brake controlling valve device upon a reduction in brake pipe pressure for venting fluid under pressure from the brake pipe to a chamber, said chamber being open through a restricted port to a passage normally communicating with the brake cylinder, said restricted port being adapted to retard the rate of flow of fluid from the brake pipe to said chamber after the brake pipe pressure equalizes into said chamber, and said passage being open to the atmosphere in the release position of the brake controlling valve device, and a check valve for preventing back flow of fluid from the brake cylinder through said passage.

32. In a fluid pressure brake equipment, the combination with a brake pipe, a brake cylinder and a brake controlling valve device operated upon a reduction in brake pipe pressure for supplying fluid under pressure to the brake cylinder to effect an application of the brakes, of a valve device operated upon a reduction in brake pipe pressure for venting fluid under pressure from the brake pipe to a chamber, said chamber being open through a restricted port to a passage normally communicating with the brake cylinder, and said passage being open to the atmosphere in the release position of the brake controlling valve device, and means included in the brake controlling valve device operative in the brake applying position of the device to close communication from said passage to the atmosphere.

33. In a fluid pressure brake equipment, the combination with a brake pipe, a brake cylinder and a brake controlling valve device operated upon a reduction in brake pipe pressure for supplying fluid under pressure to the brake cylinder to effect an application of the brakes, of a valve device operated upon a reduction in brake pipe pressure for venting fluid under pressure from the brake pipe to a chamber, said chamber being open through a restricted port to a passage normally communicating with the brake cylinder, and said passage being open to the atmosphere in the release position of the brake controlling valve device, means included in the brake controlling valve device operative in brake applying position of the device to close communication from said passage to the atmosphere, and means operated upon the development of a predetermined brake cylinder pressure to close communication from said passage to the brake cylinder.

34. In a fluid pressure brake, the combination with a brake pipe, a brake cylinder, and a chamber into which fluid under pressure is adapted to be locally vented from the brake pipe, of a passage connecting said chamber to a passage leading to the brake cylinder, means operative upon a reduction in brake pipe pressure to vent fluid under pressure from the brake pipe to said chamber, means in said connecting passage for preventing back flow of fluid from the brake cylinder passage to the chamber, and a triple valve device normally establishing communication through which the brake cylinder is open to the atmosphere and normally establishing a different communication through which said chamber is open to the atmosphere, and operative upon a reduction in brake pipe pressure to disestablish said communications and to supply fluid under pressure to the brake cylinder to effect an application of the brakes, said means operating independently of the triple valve device.

35. In a fluid pressure brake, the combination with a brake pipe, a brake cylinder, and a chamber into which fluid under pressure is adapted to be locally vented from the brake pipe, of means operative upon a reduction in brake pipe pressure to vent fluid under pressure from the brake pipe to said chamber, a triple valve device, a brake cylinder exhaust passage open to the atmosphere, another exhaust passage open to the atmosphere, a passage through which fluid vented to said chamber is adapted to flow to the brake cylinder, a check valve in said passage for preventing back flow of fluid from the brake cylinder to the chamber side of the last mentioned passage, and a slide valve included in said triple valve device normally connecting the brake cylinder to said brake cylinder exhaust passage and normally connecting said chamber to the other exhaust passage, and operative upon a reduction in brake pipe pressure to disestablish said communications and to supply fluid under pressure to the brake cylinder to effect an application of the brakes, said means operating independently of the triple valve device.

36. In a fluid pressure brake, the combination with a brake pipe, and a chamber into which fluid under pressure is adapted to be locally vented from the brake pipe, of means operative upon a reduction in brake pipe pressure to vent fluid under pressure from the brake pipe to said chamber, a triple valve device, a brake cylinder exhaust passage open to the atmosphere, another exhaust passage open to the atmosphere, a passage through which fluid vented to said chamber is adapted to flow to the brake cylinder, a check valve in said passage for preventing back flow of fluid from the brake cylinder to the chamber side of the last mentioned passage, and a slide valve included in said triple valve device normally connecting the brake cylinder to said brake cylinder exhaust passage and normally connecting said chamber to the other exhaust passage, and operated upon a reduction in brake pipe pressure to disestablish the communication from the brake cylinder and chamber to their respective exhaust passages, said means being operable independently of the triple valve device.

37. In a fluid pressure brake equipment, the combination with a brake pipe and an auxiliary reservoir, of a triple valve device subject to variations in the opposing pressures of the brake pipe and auxiliary reservoir for controlling the application and release of the brakes, said triple valve device comprising a salvaged casing having an open ended chamber from which a quick action mechanism has been removed, a cap secured to said casing and closing the open end of said chamber, and means carried by said cap operative upon an increase in brake pipe pressure in effecting the release of the brakes for venting fluid under pressure from the auxiliary reservoir.

38. In a fluid pressure brake equipment, the combination with a brake pipe and an auxiliary reservoir, of a triple valve device subject to variations in the opposing pressures of the brake pipe and auxiliary reservoir for controlling the application and release of the brakes, said triple valve device comprising a salvaged casing having an open ended chamber from which a quick action mechanism has been removed, a cap secured to said casing and closing the open end of said chamber, and means carried by said cap operative upon an increase in brake pipe pressure in effecting the release of the brakes for venting fluid under pressure from the auxiliary reservoir, said cap having a passage through which the brake pipe is connected to said means and also having a passage through which the auxiliary reservoir is connected to said means.

39. In a fluid pressure brake equipment, the combination with a brake pipe and an auxiliary reservoir, of a triple valve device subject to variations in the opposing pressures of the brake pipe and auxiliary reservoir for controlling the application and release of the brakes, said triple valve device comprising a salvaged casing having an open ended chamber from which a quick action mechanism has been removed, a cap secured to said casing and closing the open end of said chamber, and valve means carried by said cap subject on one side to brake pipe pressure and on the other side to auxiliary reservoir pressure and operative upon an increase in brake pipe pressure in effecting the release of the brakes for venting fluid under pressure from the auxiliary reservoir, said cap having passages for conducting fluid under pressure from the brake pipe and auxiliary reservoir to said valve means.

40. A fluid pressure controlled device comprising a casing having a piston chamber open at one end, a cap secured to said casing closing the open end of said chamber, a piston in said chamber adapted to be reciprocated, and a gasket interposed between said cap and casing having a thickened portion extending longitudinally of the casing into said chamber, said portion constituting a stop for said piston, the stop face of the thickened portion being located beyond the plane of separation of the casing and cap.

41. A fluid pressure controlled device comprising a casing having a piston chamber open at one end, a cap secured to said casing closing the open end of said chamber, a piston in said chamber adapted to be reciprocated, and a gasket interposed between said cap and casing having a portion extending into said chamber and engaging the interior surface of the wall of the chamber, said portion constituting a stop for said piston.

42. A fluid pressure controlled device comprising a casing having a piston chamber open at one end, a cap secured to said casing closing the open end of said chamber, an annular lug on said cap, a piston in said chamber adapted to be reciprocated, and a gasket interposed between said cap and casing and fitting around said lug and having a thickened portion extending into said chamber constituting a stop for said piston, the stop face of the thickened portion being located inwardly beyond the plane of separation of the casing and cap.

43. A fluid pressure controlled device comprising a casing having a piston chamber open at one end, a cap secured to said casing closing the open end of said chamber, an annular lug on said cap, a piston in said chamber adapted to be reciprocated, and a gasket interposed between said cap and casing and fitting around said lug and having a portion extending into and engaging the interior surface of the wall of said chamber, said portion constituting a stop for said piston.

CLYDE C. FARMER.